United States Patent
Zeng

(10) Patent No.: US 8,599,363 B2
(45) Date of Patent: Dec. 3, 2013

(54) METHOD AND APPARATUS FOR AN OBJECT DETECTION SYSTEM USING TWO MODULATED LIGHT SOURCES

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 330 days.

(21) Appl. No.: 13/080,722

(22) Filed: Apr. 6, 2011

(65) Prior Publication Data

US 2012/0256764 A1   Oct. 11, 2012

(51) Int. Cl.
   *G01C 3/08* (2006.01)
(52) U.S. Cl.
   USPC ............ 356/3.1; 356/3.01; 356/4.01; 356/4.1
(58) Field of Classification Search
   USPC ............. 356/3.01–3.15, 4.01–4.1, 5.01–5.15, 356/6–22, 28, 28.5, 139.01–139.1
   See application file for complete search history.

(56) References Cited

U.S. PATENT DOCUMENTS

| | | |
|---|---|---|
| 4,888,490 A | 12/1989 | Bass et al. |
| 5,374,985 A | 12/1994 | Beadles et al. |
| 7,154,112 B2 | 12/2006 | Eubelen |
| 7,161,664 B2 | 1/2007 | Buermann et al. |
| 7,274,438 B2 | 9/2007 | Doemens et al. |
| 7,812,931 B2 * | 10/2010 | Nishiuchi .................... 356/3.11 |
| 2007/0182949 A1 | 8/2007 | Niclass |
| 2008/0285008 A1 * | 11/2008 | Vachss et al. ................ 356/5.01 |
| 2009/0141260 A1 | 6/2009 | Kitano |

FOREIGN PATENT DOCUMENTS

DE    4137068 A1    6/1993

* cited by examiner

*Primary Examiner* — Luke Ratcliffe

(57) ABSTRACT

An object detection tracking system for a vehicle includes a first modulated light source for transmitting a first light signal with a first propagation pattern into a target region and a second modulated light source for transmitting a second light signal with a second propagation pattern into the target region. A sensor measures light reflected off objects in the target region. A controller demodulates the measured light to detect when the first or second light signals are received. The controller determines respective ranges for generating a first set of range data for the first light signal and a second set of range data for the second light signal. The controller maintains an object tracking list that includes a position of detected objects relative to the vehicle. The position of each object is determined using trilateration of the first and second sets of range data.

25 Claims, 3 Drawing Sheets

# METHOD AND APPARATUS FOR AN OBJECT DETECTION SYSTEM USING TWO MODULATED LIGHT SOURCES

BACKGROUND OF INVENTION

An embodiment relates generally to object detection and tracking.

Object detection systems include a signal emitting source and a signal receiving unit. The signal emitting source transmits a signal in a respective direction exterior of a vehicle. The signal is typically a pulsed waveform that reflects off an object in the path of the transmitted signal. The signal receiving unit focused in a same direction of the transmitted signal receives at least a portion of the transmitted signal that is reflected off the object. The distance between the vehicle and the object is determined by the duration of time that elapses from the time when the signal is transmitted and the time when the signal is received at the vehicle.

The signal emitting source in a light-based object detection system typically transmits a modulated light signal. The signal receiving unit for the light-based object detection system typically includes an array of pixels with each pixel having a field of view to detect the incoming light. The larger the number of pixels used in the array, they greater the accuracy in determining the range and position of the object. However, due to the cost of pixels, a reduced number of pixels may be used. Using a reduced number of pixels may result in ambiguity of the position of the detected object. For example, given a 16 pixel sensor having a 60 degree field-of-view optic, a lateral ambiguity of the sensed target is 5.5 meters at a distance of 100 meters. Reducing the number of pixels increases the ambiguity of the position of the object. What is needed is a system that can provide a reliable position of a detected object while utilizing a sensor with a reduced number of pixels.

SUMMARY OF INVENTION

An advantage of an embodiment is the detection and tracking of objects in a target region of the vehicle using a less than an optimum number of pixels in a sensor for determining a range and a position of the object relative to the vehicle. A trilateration technique is used to calculate resulting range and azimuth measurement between the vehicle and the object utilizing measured distances obtained from two independent modulated light sources. The system as described herein overcomes the conventional deficiency of azimuth measurement accuracy.

An embodiment contemplates a method of tracking objects exterior of a vehicle. A first light signal having a first propagation pattern is transmitted from a first modulated light source into a target region, the first modulated light source being disposed on a first region of the vehicle. A second light signal is transmitted having a second propagation pattern from a second modulated light source into the target region. The second modulated light source is disposed on a second region of the vehicle. A light reflected off an object in a target zone is measured by a sensor. The sensor including at least one pixel. The measured light is demodulated by a controller when the first or second light signals are received. The controller determines respective ranges in response to a time delay associated with the at least one pixel from a time when the first or second light signal is transmitted until the corresponding light signal is detected to generate a first set of range data for the first light signal and a second set of range data for the second light signal. An object tracking list is maintained that includes a position of detected objects relative to the vehicle. The position of each object is determined using trilateration of the first and second sets of range data.

An embodiment contemplates an object detection tracking system for a vehicle. A first modulated light source is disposed on a first region of the vehicle for transmitting a first light signal with a first propagation pattern into a target region. A second modulated light source is disposed on a second region of the vehicle for transmitting a second light signal with a second propagation pattern into the target region. A sensor including at least one pixel is disposed on the vehicle for measuring light reflected off objects in the target region. A controller demodulates the measured light to detect when the first or second light signals are received. The controller determines respective ranges in response to a time delay associated with the at least one pixel from a time when the first or second light signal is transmitted until the corresponding light signal is detected for generating a first set of range data for the first light signal and a second set of range data for the second light signal. The controller maintains an object tracking list that includes a position of detected objects relative to the vehicle. The position of each object is determined using trilateration of the first and second sets of range data.

DETAILED DESCRIPTION

Figure 1:
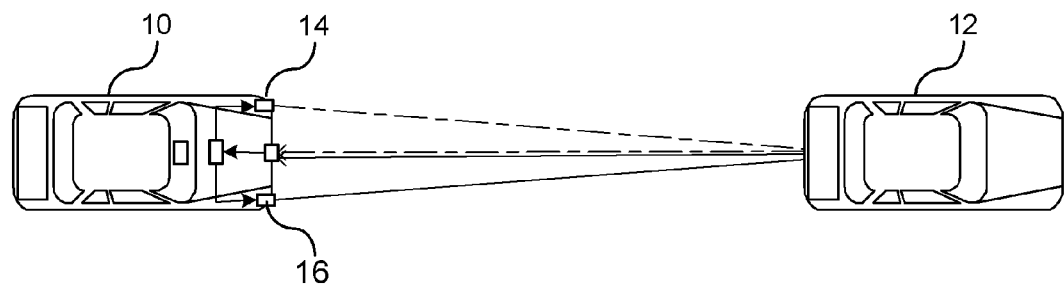
FIG. 1 illustrates a vehicle equipped with an object detection system according to an embodiment.
Figure 2:
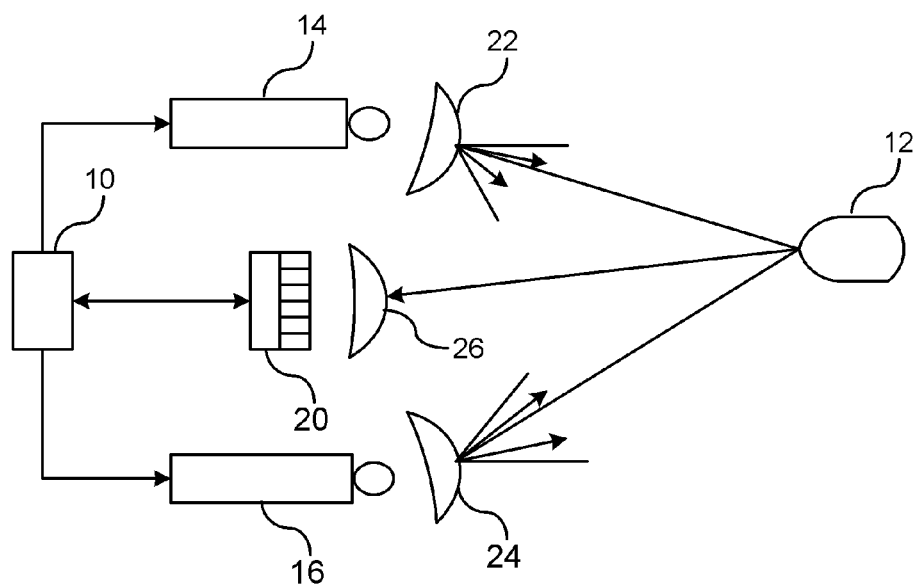
FIG. 2 is a block diagram of the object detection system according to the embodiment.

There is shown in FIGS. 1 and 2 an object detection tracking system for detecting and tracking objects in a path of travel of a driven vehicle 10. FIG. 1 illustrates the driven vehicle 10 detecting and tracking the object 12 forward of the driven vehicle. It should be understood that the tracking system is not limited to the objects forward of the vehicle 10, but may be incorporated to detect objects in any surrounding direction of the vehicle 10.

Referring to both FIGS. 1 and 2, the object detection tracking system includes a first modulated light source 14, a second modulated light source 16, a controller 18, and a sensor 20.

The first modulated light source 14 is disposed on a first region of the vehicle 10, such as a front left bumper of the vehicle, for transmitting a first light signal into a target region. The first modulated light source 14 includes circuitry for modulating the first light signal. The first modulated light source may include, but is not limited to, a laser diode or a light emitting diode (LED) for generating the light signal. An optical lens 22 may be provided for diffusing the light signal. The diffused light signal is transmitted with a first propagation pattern into a target region for detecting the objects within the target region.

The second modulated light source 16 is disposed on a second region of the vehicle 10, such as a front right bumper of the vehicle, for transmitting a second light signal into the target region. The second modulated light source 16 includes circuitry for modulating the second light signal. The second modulated light source 16 is independent from the first modulated light source 14. The term independent as described herein is defined as being in separate modules or packaging units. The respective modulated light sources are preferably spaced apart on opposing sides of the vehicle so as to broaden the cooperative field of view generated by both respective light sources. The second modulated light source 16 may include, but is not limited to, a laser diode or a LED for generating the light signal. An optical lens 24 may be provided for diffusing the second light signal. The diffused light signal is transmitted with a second propagation pattern into a target region for detecting the objects within the target region.

The sensor 20 is disposed on the vehicle for measuring light reflected off objects in the target region. The sensor includes at least one pixel for receiving the first and second light signal. The pixel may include a photodetector. An optical lens 26 may be provided for re-focusing the received light signal onto the sensor 20. A distance is measured from the first modulated light source to the object based off of the first light signal. A distance is measured from the second modulated light source to the object based off of the second light signal. If a plurality of pixels is used, the accuracy of the measurements is enhanced as a result of increasing the resolution of each pixel. For example, if a 40 degree field of view is desired and if a single pixel is used in the sensor, the then the degree of accuracy for the sensor may be 40 degrees. If a plurality of pixels are used (e.g., 10 pixels) to sense the same 40 degree field of view, the number of pixels increases the resolution. As a result, each pixel may sense 4 degrees which provides a 4 degree of accuracy. In utilizing a plurality of pixels, the first or second light signal is transmitted until the corresponding light signal is detected for generating a first set of pixel-by-pixel range data for the first light signal and a second set of pixel-by-pixel range data for the second light signal. Light signals received by each pixel are cooperatively used to determine both the distance from the vehicle to the object and the position of the object relative to the vehicle.

The measurement data is provided to the controller 18 for determining the range and position of the object relative to the object. A time-division multiplexing technique such as a time division multiple access (TDMA) technique is applied so those more than one signal may be communicated over a respective channel. The time-division multiplexing technique is a channel access method that allows more than one signal to share a same communication channel. The signals are assigned to different time slots within the same channel, which allow the signals to be transmitted and received in rapid succession for processing. The controller 18 determines a position of the object relative to the vehicle using a trilateration technique.

Figure 3:
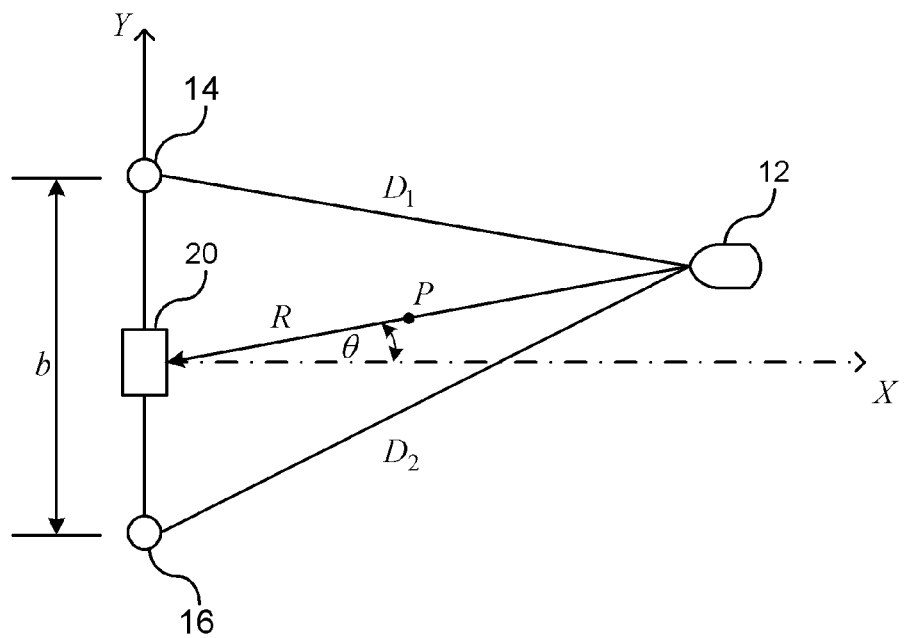
FIG. 3 a geometric arrangement of the trilateration configuration between the vehicle transmitters and detected objects according to the embodiment.

FIG. 3 illustrates the trilateration technique utilizing the measured distances between the first and second modulated light sources and the object. The first modulated light source, the second modulated light source, and the object form points of an imaginary triangle. The distances between each of the points are utilized by the trilateration technique for determining a resulting range R between the vehicle, and also the object and a position of the object relative to the vehicle. The various lengths (i.e., distances between the respective points) of the imaginary triangle may be represented by $D_1$, $D_2$, and b. The distance $D_1$ is determined as a function of the measured light signal from the first modulated light source 14 to the object 12. The distance $D_2$ is determined as a function of the measured light signal from the second modulated light source 16 to the object 12. The distance b is a fixed distance between the first and second modulated light sources and does not vary regardless of the position of the object 12 relative to the vehicle 10. The trilateration technique uses the distances $D_1$, $D_2$, and b to determine a center point P within the imaginary triangle. A line segment that that represents the resulting range R, intersects the center point P as it extends from the object 12 to the vehicle 10. The resulting range R may be determined according to the following formula:

$$R = \frac{-b^2 + 2D_1^2 + 2D_2^2}{4(D_1 + D_2)}$$

where R is the resulting range from the object to the sensor, b is the predetermined distance between the first and second modulated light sources, $D_1$ is the measured distance from the first modulated light source to the object, and $D_2$ is the measured distance from second modulated light source to the object.

The trilateration technique is used to determine an azimuth measurement that is an angular measurement $\theta$ between the segment representing the resulting range R and a segment that is projected perpendicular to the vehicle (e.g., fascia of the vehicle). An azimuth angle may be calculated according to the following formula:

$$\theta = \arcsin \frac{b^2 D_1 + b^2 D_2 - 4D_1 D_2^2 + 4D_1^2 D_2}{b(b^2 - 2D_1^2 - 2D_2^2)}$$

where $\theta$ is the azimuth angle, b is the predetermined distance between the first and second modulated light sources, $D_1$ is the measured distance from the first modulated light source to the object, and $D_2$ is the measured distance from second modulated light source to the object.

Given the distance of the resulting range and the calculated azimuth angle, the position of the object relative to the vehicle is determined. The controller 18, or similar module, maintains an object tracking list of the detected objects relative to the vehicle. The list is constantly updated with a vehicle position as the objects within the target range are detected. An object no longer detected by the object detection tracking system is dropped from the list, whereas objects newly detected by the system are added to the object tracking list.

Figure 4:
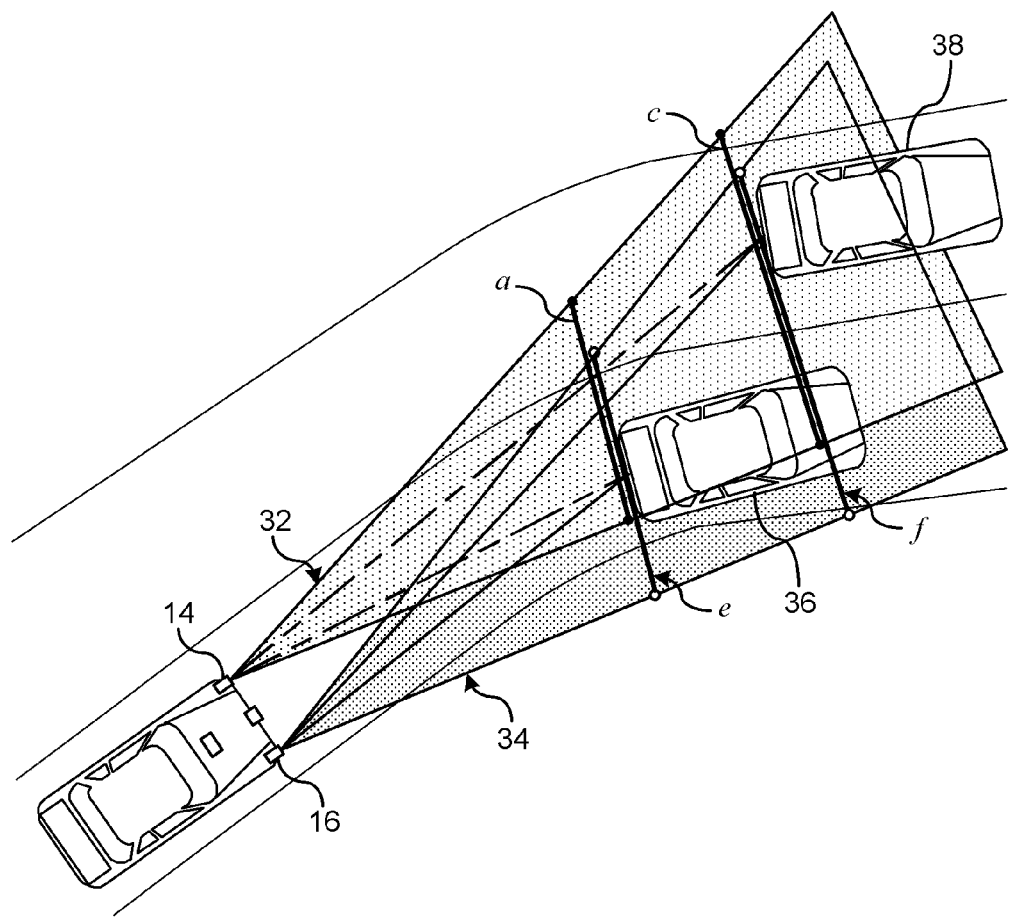
FIG. 4 illustrates the propagating signal for distance association matching according to the embodiment.

FIG. 4 illustrates a distance association matching technique used when multiple objects are detected in the targeted region. The area designated by 30 is a first light signal propagation pattern generated by the first modulated light source 14. The area designated by 32 is a second light signal propagation pattern generated by the second modulated light source 16. Elements 34 and 36 represent detected objects within the propagation patterns. Issues in associating measurement data from both modulated light sources may present if more than one object is detected within the target region, and more specifically, if a lower resolution sensor is used, such as a single pixel. To determine if the respective measurement data from each respective light source is associated with one another, a respective pair of measurement data from the first and second modulated light signal is compared to a difference threshold. That is, measurement data of the first modulated light signal is compared to the measurement data of the second modulated light signal for determining whether the pair of measurements are close to one another. For example, as shown in FIG. 4, measurements a and c are from the first modulated light source, and measurements d and f are from the second modulated light source. Measurements a and d can be paired and measurements d and f can be paired using the distance matching technique since the measurement data within each pair is within a predetermined threshold of one another.

Figure 5:
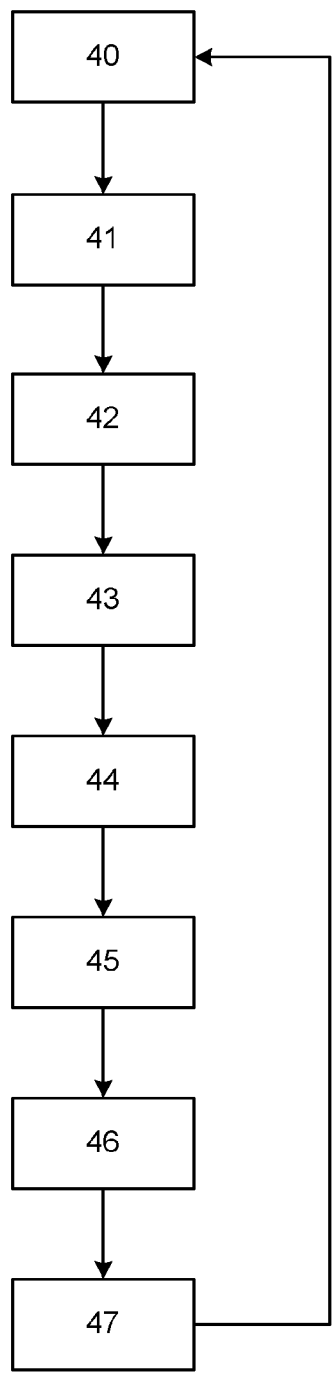
FIG. 5 is a flowchart of a method for detecting and tracking an object.

FIG. 5 illustrates a method for tracking objects detected by the object detection tracking system. In step 40, object detection tracking technique is initiated. In step 41, a target region exterior of the vehicle is electronically scanned using a first modulated light source and a second modulated light source.

In step 42, ranges from the first and second modulated light sources are measured. Data association matching may be applied if necessary.

In step 43, a resulting range and an azimuth angle is determined using the trilateration technique for each object detected within the target region. The trilateration technique is based on the measurement data of the first and second light signals in addition to the predetermined distance between the first and second modulated light sources.

In step 44, a position of each object is determined based on the determined resulting range and azimuth measurement.

In step 45, an object tracking list is updated. Updating the object tracking list may include adding new objects to the list, modifying an existing position of an object, and deleting obsolete objects from the list.

In step 46, a particle filtering algorithm is implemented giving two new measurements (matched from left and right measurements). Assume each track is modeled as a list of particles $\{x_i | i=1, \ldots, N\}$ with each particle $x_i$ representing a possible configuration of position and velocity for the target. Each particle $x_i$ associated with a weight $w_i$ denoting the possibility of this configuration and, thus, $$\sum_{i=1}^{N} w_i = 1.$$

Use the coordinate system illustrated in FIG. 3. Let $D_1$ and $D_2$ denote the left and right measurements, respectively. Assume a particle $x_i$ is represented by its range and azimuth angle: $x_i = (R_i, \theta_i)$. The following measurement equations are used for updating the weight for the i-th particle:

$$w_i = e^{-\frac{D_1 - (R_i^2 - R_i \sin\theta_i b + R_i)}{2\sigma^2}} e^{-\frac{D_2 - (R_i^2 + R_i \sin\theta_i b + R_i)}{2\sigma^2}}$$

where $\sigma$ is sensor error constant.
The yielded weights are then normalized as follows:

$$\overline{w}_i = \frac{w_i}{\sum_{i=1}^{N} w_i}$$

The updated track for range and azimuth can be computed by using the following formulas:

$$\theta = \sum_{i=1}^{N} w_i \theta_i, \; R = \sum_{i=1}^{N} w_i R_i$$

In step 47, the object tracking list is utilized by a vehicle application or provided to a driver of the vehicle. For example, the positions and ranges of the objects in the object tracking list may be provided to other vehicle applications that for executing their respective algorithms (e.g., forward collision warning system). Alternatively, the object list is utilized by a vehicle application or provided to a driver of the vehicle through an HMI device for alerting the driver of various objects within the target region of the vehicle.

While certain embodiments of the present invention have been described in detail, those familiar with the art to which this invention relates will recognize various alternative designs and embodiments for practicing the invention as defined by the following claims.

What is claimed is:

1. An object detection tracking system for a vehicle comprising:
   a first modulated light source disposed on a first region of the vehicle for transmitting a first light signal with a first propagation pattern into a target region;
   a second modulated light source disposed on a second region of the vehicle for transmitting a second light signal with a second propagation pattern into the target region;
   a sensor including at least one pixel disposed on the vehicle for measuring light reflected off objects in the target region; and
   a controller for demodulating the measured light to detect when the first or second light signals are received, the controller determining respective ranges in response to a time delay associated with the at least one pixel from a time when the first or second light signal is transmitted until the corresponding light signal is detected to generate a first set of range data for the first light signal and a second set of range data for the second light signal;
   wherein the controller maintains an object tracking list that includes a position of detected objects relative to the vehicle, and wherein the position of each object is determined using trilateration of the first and second sets of range data.

2. The object detection tracking system of claim 1 wherein the position of the vehicle is identified by an azimuth angle and a resulting range between the vehicle and the object, wherein the azimuth angle and the resulting range is calculated using trilateration.

3. The object detection tracking system of claim 2 wherein the controller applies a time-division multiplexing technique for processing the received light signals at different time slots.

4. The object detection tracking system of claim 2 wherein the object tracking list maintains a plurality of objects detected by the vehicle, and wherein objects are continuously tracked by their position relative to the vehicle.

5. The object detection tracking system of claim 2 wherein the azimuth angle as determined by the controller is represented by the following formula:

$$\theta = \arcsin \frac{b^2 D_1 + b^2 D_2 - 4 D_1 D_2^2 + 4 D_1^2 D_2}{b(b^2 - 2D_1^2 - 2D_2^2)}$$

where $\theta$ is the azimuth angle, b is the predetermined distance between the first and second modulated light sources, $D_1$ is the distance from the first modulated light source to the object, and $D_2$ is the distance from second modulated light source to the object.

6. The object detection tracking system of claim 2 wherein the resulting range as determined by the controller is represented by the following formula:

$$R = \frac{-b^2 + 2D_1^2 + 2D_2^2}{4(D_1 + D_2)}$$

where R is the resulting range from the object to the sensor, b is the predetermined distance between the first and second modulated light sources, $D_1$ is the distance from the first modulated light source to the object, and $D_2$ is the distance from second modulated light source to the object.

7. The object detection tracking system of claim 2 wherein the sensor includes a photodetector.

8. The object detection tracking system of claim 7 wherein the photodetector comprises a single pixel.

9. The object detection tracking system of claim 7 wherein the photodetector comprises an array of pixels.

10. The object detection tracking system of claim 7 wherein the sensor includes a plurality of pixels, and wherein the controller determines the respective ranges in response to a time delay associated with each pixel from a time when the first or second light signal is transmitted until the corresponding light signal is detected to generate a first set of pixel-by-pixel range data for the first light signal and a second set of pixel-by-pixel range data for the second sight signal.

11. The object detection tracking system of claim 1 wherein the first and second modulated light sources are LED.

12. The object detection tracking system of claim 1 wherein the first and second modulated light sources are laser diode.

13. A method for tracking objects exterior of a vehicle, the method comprising the steps of:
transmitting a first light signal having a first propagation pattern from a first modulated light source into a target region, the first modulated light source being disposed on a first region of the vehicle;
transmitting a second light signal having a second propagation pattern from a second modulated light source into the target region, the second modulated light source being disposed on a second region of the vehicle;
measuring a light reflected off an object in a target zone by a sensor, the sensor including at least one pixel,
demodulating the measured light by a controller when the first or second light signals are received, wherein the controller determines respective ranges in response to a time delay associated with the at least one pixel from a time when the first or second light signal is transmitted until the corresponding light signal is detected to generate a first set of range data for the first light signal and a second set of range data for the second light signal;
maintaining an object tracking list that includes a position of detected objects relative to the vehicle, and wherein the position of each object is determined using trilateration of the first and second sets of range data.

14. The method of claim 13 wherein the position of the vehicle is identified by an azimuth angle and a resulting range between the vehicle and the object, wherein the azimuth angle and the resulting range determined using trilateration.

15. The method of claim 14 wherein a time-division multiplexing technique is used to process the light signals received by the sensor at different time slots.

16. The method of claim 14 wherein the sensor includes a photodetector for receiving the reflected light signals from the first and second modulated light sources.

17. The method of claim 16 wherein a single pixel photodetector receives the reflected light signals.

18. The method of claim 16 wherein an array of pixel photodetectors receives the reflected light signals.

19. The method of claim 18 wherein a first set of pixel-by-pixel range data for the first light signal and a second set of pixel-by-pixel range data for the second sight signal is generated in response to reflected light signals being received by the array of pixels, wherein the controller determines the respective ranges in response to a time delay associated with each pixel from a time when the first or second light signal is transmitted until the corresponding light signal is detected.

20. The method of claim 14 wherein the determination of the azimuth angle is represented by the following formula:

$$\theta = \arcsin\frac{b^2 D_1 + b^2 D_2 - 4 D_1 D_2^2 + 4 D_1^2 D_2}{b(b^2 - 2D_1^2 - 2D_2^2)}$$

where $\theta$ is the azimuth angle, b is the predetermined distance between the first and second modulated light sources, $D_1$ is the distance from the first modulated light source to the object, and $D_2$ is the distance from second modulated light source to the object.

21. The method of claim 14 wherein calculating the resulting range via a trilateration technique is represented by the following formula:

$$R = \frac{-b^2 + 2D_1^2 + 2D_2^2}{4(D_1 + D_2)}$$

where b is the predetermined distance between the first and second modulated light sources, $D_1$ is the distance from the first modulated light source to the object, and $D_2$ is the distance from second modulated light source to the object.

22. The method of claim 14 wherein the object is tracked in multiple tracking frames, wherein the object tracked in each frame is represented by a set of particles, and wherein each particle is represented by a respective range and respective azimuth angle, and wherein a weighting factor for the set of particles is represented by the following formula:

$$w_i = e^{-\frac{D_1 - (R_i^2 - R_i \sin\theta_i b + R_i)}{2\sigma^2}} e^{-\frac{D_2 - (R_i^2 + R_i \sin\theta_i b + R_i)}{2\sigma^2}}$$

where b is the predetermined distance between the first and second modulated light sources, $D_1$ is the distance from the first modulated light source to the object, and $D_2$ is the distance from second modulated light source to the object, $\theta_i$ is a determined azimuth angle for a respective particle, $R_i$ is a determined range for a respective particle, and $\sigma$ is a sensor error constant.

23. The method of claim 22 wherein a weighted azimuth based on set of particles is represented by the following formula:

$$\theta = \sum_{i=1}^{N} w_i \theta_i$$

where $w_i$ is the weighting factor of a respective particle, and $\theta_i$ is the azimuth angle of a respective particle.

24. The method of claim 22 wherein a weighted range based on set of particles is represented by the following formula:

$$R = \sum_{i=1}^{N} w_i R_i$$

$w_i$ is the weighting factor of a respective particle, and $R_i$ is the resulting range of a respective particle.

25. The method of claim 13 wherein a data association matching technique is applied for matching the first set of range data from the first modulated light source and the second set of range data from the second modulated light source to a same object, the data association matching technique comprising the steps of:

determining whether the first set of range data from the first modulated light source to the object and the second set of range data from the second modulated light source to the object are within a predetermined threshold of one another; and associating the object with the first and second sets of range data in response to the first and second sets of range data being with the predetermined threshold.

* * * * *